Figure 1:
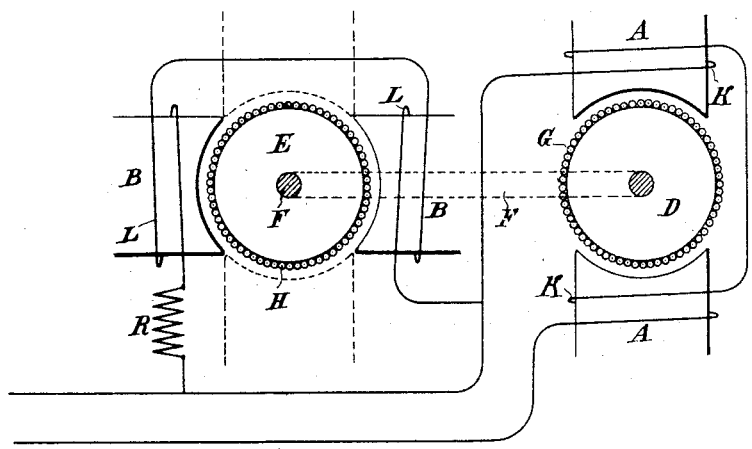

(No Model.)

W. STANLEY, Jr., J. F. KELLY & C. C. CHESNEY.
ALTERNATE CURRENT MOTOR.

No. 515,977. Patented Mar. 6, 1894.

Witnesses:
Raphael Netter
James H. Catlow

Inventors
William Stanley Jr.,
John F. Kelly and
Cummings C. Chesney
by Duncan & Page
Attorneys.

UNITED STATES PATENT OFFICE.

WILLIAM STANLEY, JR., JOHN F. KELLY, AND CUMMINGS C. CHESNEY, OF PITTSFIELD, MASSACHUSETTS, ASSIGNORS TO THE STANLEY LABORATORY COMPANY, OF SAME PLACE.

ALTERNATE-CURRENT MOTOR.

SPECIFICATION forming part of Letters Patent No. 515,977, dated March 6, 1894.

Application filed April 1, 1893. Serial No. 468,744. (No model.)

*To all whom it may concern:*

Be it known that we, WILLIAM STANLEY, Jr., JOHN F. KELLY, and CUMMINGS C. CHESNEY, citizens of the United States, and residents of Pittsfield, in the county of Berkshire and State of Massachusetts, have invented certain new and useful Improvements in Methods of Operating Alternate-Current Motors, of which the following is a specification, reference being had to the drawings accompanying and forming a part of the same.

Our present invention is an improvement in methods of operating alternate current motors, the object of which is to produce a motor that may be run or operated from a single circuit carrying alternating currents and which on such circuit will be self-starting.

In carrying out our invention we employ a motor of the general form described and shown in the application of William Stanley, Jr., Serial No. 428,950, filed April 13, 1892, and which is constructed in the following manner:—Two sets of field magnets are employed, that are adapted to set up fields of force independent of each other, in the sense that their effects are manifested in different planes. Within the influence of these fields two armatures are mounted, preferably on the same shaft and in fixed relations to each other, and which are wound with coils, those on one armature being closed through corresponding coils on the other. The poles of the two fields may be in alignment, in which case the coils of one armature are displaced with respect to those on the other, or the two sets of poles may be displaced and the coils of the two armatures in alignment. In either event if the fields be energized by alternating currents displaced in phase the motor is rotated and has the capability of starting with a good torque.

According to our present invention we construct the motor so that in starting it will contain and exhibit the characteristics above described, but we provide also for mechanically shifting the displaced elements—the armature coils or field poles,—so as to bring them into alignment as soon as the motor is brought to speed. We prefer to shift the field poles, as there are fewer mechanical difficulties in the way of this, and in our present application the description will be confined to this method of carrying out the invention.

In order to start the motor any of the plans for producing a difference of phase, either magnetic or electrical, between the two sets of fields, may be employed, and as long as such fields are displaced the motor will have a starting torque, but when the motor has been brought to speed and the poles shifted the electric or magnetic phases of the two fields are brought into accord, so that the motor will continue to run, but as a single phase motor.

The two methods of operating the motors shown in the accompanying drawings will serve to illustrate the nature and purpose of our invention.

Figure 2:
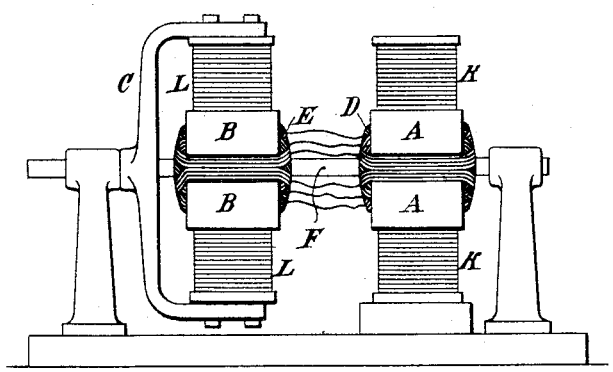

Figure 1 is a diagrammatic illustration of the invention. Fig. 2 is a side view of a means for supporting and rotating or shifting one of the fields.

A A designate opposite field poles which are stationary; B B designate similar poles which are mounted in any convenient manner, as by connection to a frame or spider C, whereby they may be set horizontally or vertically, or at any intermediate angle.

D E are the armatures that are mounted on the same shaft F, so as to be within the two fields respectively. These armatures are wound with coils G H, parallel with their axes, which coils are connected together in alignment, as hereinbefore described.

In the form of motor shown in Fig. 1, the adjustable shifting field poles B are set as indicated in full lines at right angles to the stationary poles A. The coils K L of the two fields are then connected in derivation to a source or circuit of alternating currents and provision is made for producing the proper difference in phase between the currents in the two circuits by the introduction of a resistance capacity or its equivalent in one circuit, as indicated at R. When by such arrangements the motor is brought to speed, the poles B are shifted to a position in alignment with poles A, and the resistance R withdrawn to bring the phases of the current in both fields into accord. The motor will then run as a single phase motor.

Having now described our invention, what we claim is—

1. The method, herein described, of operating alternate current electric motors having independent fields, and armatures the coils of which are connected together in closed circuit, which consists in angularly displacing one of the elements of one part of the motor with respect to the corresponding element of the other until the motor has been brought to speed, and then bringing said elements into alignment, as set forth.

2. The method, herein described, of operating electric motors having independent field magnets and mechanically connected armatures the coils of which are connected together in closed circuit, which consists in setting the poles of one field at an angle to those of the other and directing through the two fields respectively alternating currents of different phase, and then when the motor is brought to speed, turning the poles of the two fields into alignment and directing through both alternating currents of the same phase, as set forth.

WILLIAM STANLEY, JR.
JOHN F. KELLY.
CUMMINGS C. CHESNEY.

Witnesses:
JOHN F. VAN DUSEN,
SAMUEL E. ROBINSON,
W. B. TOBEY.